(12) United States Patent
Bittar et al.

(10) Patent No.: US 7,982,464 B2
(45) Date of Patent: Jul. 19, 2011

(54) DRILLING SYSTEMS AND METHODS USING RADIAL CURRENT FLOW FOR BOUNDARY DETECTION OR BOUNDARY DISTANCE ESTIMATION

(75) Inventors: Michael S. Bittar, Houston, TX (US); Guoyu Hu, Houston, TX (US); William E. Hendricks, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/067,582

(22) PCT Filed: May 1, 2007

(86) PCT No.: PCT/US2007/010514
§ 371 (c)(1),
(2), (4) Date: Mar. 20, 2008

(87) PCT Pub. No.: WO2008/136789
PCT Pub. Date: Nov. 13, 2008

(65) Prior Publication Data
US 2010/0176812 A1 Jul. 15, 2010

(51) Int. Cl.
*G01V 3/18* (2006.01)
(52) U.S. Cl. ........................................ 324/339
(58) Field of Classification Search ........... 324/338–339
See application file for complete search history.

(56) References Cited

U.S. PATENT DOCUMENTS

| | | |
|---|---|---|
| 3,582,766 A | 6/1971 | Lizuka |
| 4,207,619 A | 6/1980 | Klaveness |
| 4,683,557 A | 7/1987 | Willis |
| 4,965,774 A | 10/1990 | Ng et al. |
| 5,144,589 A | 9/1992 | Hardage |
| 5,325,714 A | 7/1994 | Lende et al. |
| 5,339,037 A * | 8/1994 | Bonner et al. ............ 324/366 |
| 5,442,294 A | 8/1995 | Rorden |
| 5,594,343 A * | 1/1997 | Clark et al. ............ 324/338 |
| 5,678,643 A | 10/1997 | Robbins et al. |
| 5,780,784 A | 7/1998 | Robbins |
| 5,995,446 A | 11/1999 | Meyer et al. |
| 6,023,443 A | 2/2000 | Dubinsky et al. |
| 6,088,294 A | 7/2000 | Leggett et al. |
| 6,131,694 A | 10/2000 | Robbins et al. |
| 6,166,994 A | 12/2000 | Jeffryes |
| 6,188,222 B1 | 2/2001 | Seydoux et al. |
| 6,206,108 B1 | 3/2001 | MacDonald et al. |
| 6,359,438 B1 * | 3/2002 | Bittar ...................... 324/369 |
| 6,382,332 B1 | 5/2002 | Eaton |
| 6,480,118 B1 | 11/2002 | Rao |
| 6,556,014 B1 | 4/2003 | Kong et al. |
| 6,633,252 B2 | 10/2003 | Stolarczyk et al. |
| 6,670,813 B2 | 12/2003 | Strack |
| 6,747,914 B2 | 6/2004 | Aronstam |
| 6,791,469 B1 | 9/2004 | Rao et al. |

(Continued)

*Primary Examiner* — Jay M Patidar
(74) *Attorney, Agent, or Firm* — Krueger Iselin LLP

(57) ABSTRACT

Systems and methods for look-ahead boundary detection and distance estimation are disclosed. In some embodiments, a drilling method includes extending a borehole with a drill string that includes a resistivity logging tool. The logging tool makes upward-looking and downward-looking resistivity measurements based on radial current flow. The upward looking and downward looking resistivity measurements are processed to estimate the distance to approaching bed boundaries, and drilling can be halted when the estimated distance reaches a desired value. Such information can be used to anchor casing at advantageous points and can further be used to avoid penetrating water-containing formations below a hydrocarbon reservoir.

19 Claims, 9 Drawing Sheets

U.S. PATENT DOCUMENTS

| | | |
|---|---|---|
| 6,819,110 B2 | 11/2004 | Omeragic et al. |
| 6,837,332 B1 | 1/2005 | Rodney |
| 6,896,074 B2 | 5/2005 | Cook et al. |
| 6,907,348 B2 | 6/2005 | Gaston et al. |
| 6,967,898 B2 | 11/2005 | Leaney |
| 6,977,866 B2 | 12/2005 | Huffman et al. |
| 7,013,991 B2 | 3/2006 | Wilson-Langman et al. |
| 7,046,165 B2 | 5/2006 | Beique et al. |
| 7,063,174 B2 | 6/2006 | Chemali et al. |
| 7,139,219 B2 | 11/2006 | Kolle et al. |
| 7,274,990 B2 | 9/2007 | Mathiszik et al. |
| 7,289,909 B2 | 10/2007 | Thomann et al. |
| 7,299,884 B2 | 11/2007 | Mathiszik |
| 7,301,852 B2 | 11/2007 | Leggett et al. |
| 7,310,580 B2 | 12/2007 | Zhou et al. |

\* cited by examiner

DRILLING SYSTEMS AND METHODS USING RADIAL CURRENT FLOW FOR BOUNDARY DETECTION OR BOUNDARY DISTANCE ESTIMATION

BACKGROUND

Modern petroleum drilling and production operations demand a great quantity of information relating to parameters and conditions downhole. Such information typically includes characteristics of the earth formations traversed by the borehole, in addition to data relating to the size and configuration of the borehole itself. Oilfield operators use this information to locate and determine the potential yield of hydrocarbon reservoirs, and to place and configure wells in an optimal manner.

Oilfield operators often face the question of when to stop drilling. They often wish to avoid drilling too far into a subsequent formation. For example, when setting casing to line the borehole, the driller may desire to have the casing anchored in a cohesive bed rather than a highly fractured or sandy bed. In other circumstances, the driller may wish to anchor the casing in the bed above the hydrocarbon reservoir, and later may wish to avoiding drilling through the bottom of the reservoir. One method for determining stop points employs a pilot borehole which is logged and used as a reference for the current borehole. Operators can obtain logs from each borehole using logging while drilling (LWD) resistivity tools such as those disclosed in U.S. Pat. No. 6,359,438 to Bittar, entitled "Multi-Depth Focused Resistivity Imaging Tool for Logging While Drilling Applications", and U.S. Pat. No. 5,339,037 to Bonner et al., entitled "Apparatus and Method for Determining the Resistivity of Earth Formations".

To determine the current bit position relative to formation boundaries, the driller correlates logging measurements from the current borehole with the pilot borehole log. However, this approach may be unreliable due to the dip and thickness variation of the earth formations between the boreholes.

BRIEF DESCRIPTION OF THE DRAWINGS

A better understanding of the various disclosed embodiments can be obtained when the following detailed description is considered in conjunction with the following drawings, in which.

Figure 1:
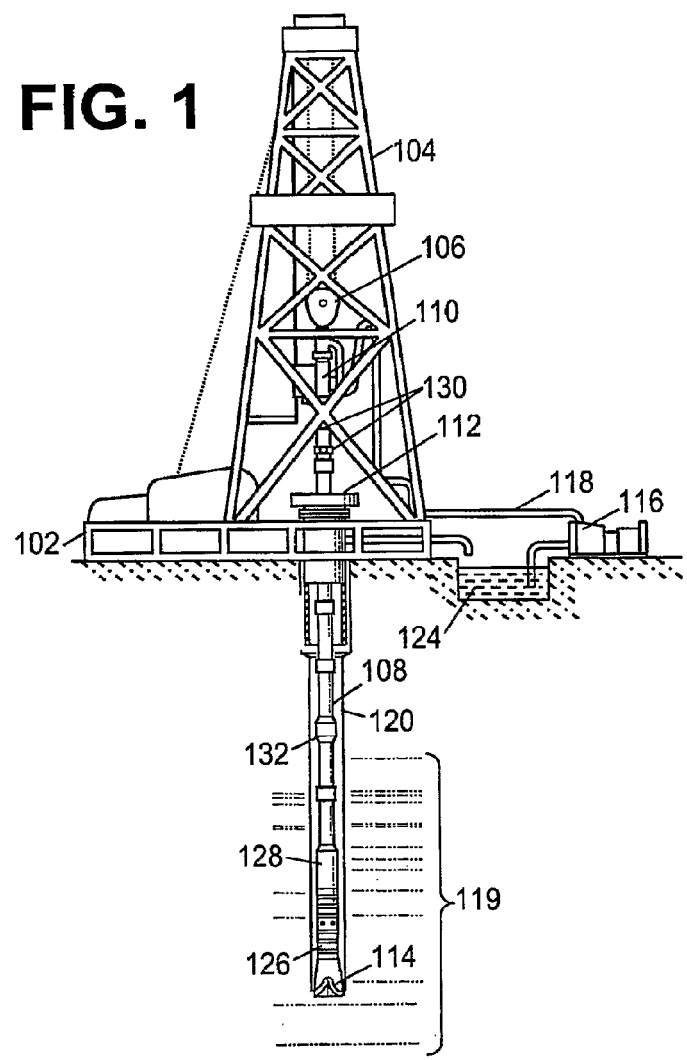
FIG. 1 shows an illustrative logging while drilling (LWD) environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the appended claims.

DETAILED DESCRIPTION

Accordingly, there are disclosed herein various systems and methods for "look-ahead" bed boundary detection. In some embodiments, a resistivity tool employs toroidal antennas to induce current flows along the drill string from both directions relative to a sensing assembly. From the directional measurements, the resistivity tool can synthesize a bed boundary indicator and can enable estimation of the distance to a bed boundary at least 20 feet before the boundary is encountered by the drill bit. With such information a driller can avoid penetrating undesired formations, e.g., formations that would be unsuitable for anchoring well casing, or water-containing formations below a hydrocarbon reservoir.

The disclosed systems and methods are best understood in the context of the environment in which they operate. Accordingly, an illustrative logging while drilling (LWD) environment is shown in FIG. 1. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Connected to the lower end of the drill string 108 is a drill bit 114. The bit 114 is rotated and drilling accomplished by rotating the drill string 108, by use of a downhole motor near the drill bit, or by both methods. Drilling fluid, termed "mud", is pumped by mud recirculation equipment 116 through supply pipe 118, through top drive 110, and down through the drill string 108 at high pressures and volumes to emerge through nozzles or jets in the drill bit 114. The mud then travels back up the hole via the annulus formed between the exterior of the drill string 108 and the borehole wall 120, through a blowout preventer, and into a mud pit 124 on the surface. On the surface, the drilling mud is cleaned and then recirculated by recirculation equipment 116. The drilling mud is used to cool the drill bit 114, to carry cuttings from the base of the bore to the surface, and to balance the hydrostatic pressure in the rock formations.

In wells employing acoustic telemetry for LWD, downhole sensors (including resistivity logging tool 126) are coupled to an acoustic telemetry transmitter 128 that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string to receive and retransmit the telemetry signals. The repeater modules 132 include both an acoustic telemetry receiver array and an acoustic telemetry transmitter configured similarly to receiver array 130 and the transmitter 128.

Resistivity logging tool 126 is integrated into the bottom-hole assembly near the bit 114. As the bit extends the borehole through the formations 119, the downhole sensors collect measurements relating to various formation properties as well as the tool orientation and position and various other drilling conditions. (The orientation measurements may be performed using an azimuthal orientation indicator, which may include magnetometers, inclinometers, and/or accelerometers, though other sensor types such as gyroscopes may be used. In some embodiments, the tool includes a 3-axis fluxgate magnetometer and a 3-axis accelerometer.) Resistivity logging tool 126 may take the form of a drill collar, i.e., a thick-walled tubular that provides weight and rigidity to aid the drilling process.

Figure 2:
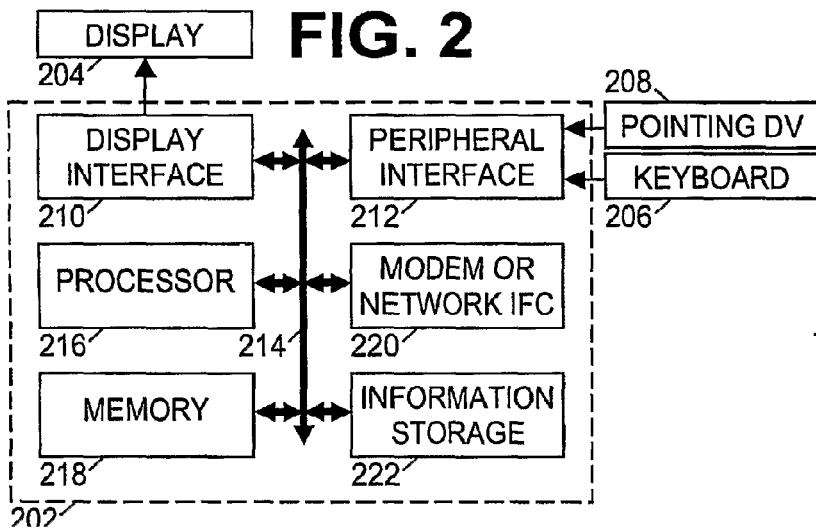
FIG. 2 shows a block diagram of an illustrative computer for collecting and processing logging data.

A surface computing facility collects logging data provided by the logging tool 126 and processes it in accordance with one or more methods disclosed herein to generate and display a "look-ahead" bed boundary indicator that is particularly suitable for drilling at low dip angles (e.g., in vertical wells). FIG. 2 shows a block diagram of a computer (such as a desktop computer) suitable for performing this function. The computer of FIG. 2 includes a chassis 202, a display 204, and one or more input devices 206, 208. The chassis 202 is coupled to the display 204 and the input devices 206, 208 to interact with a user. The display 204 and the input devices 206, 208 together operate as a user interface. The display 204 often takes the form of a video monitor, but may take many alternative forms such as a printer, a speaker, or other means for communicating information to a user. The input device 206 is shown as a keyboard, but may similarly take many alternative forms such as a button, a mouse, a keypad, a dial, a motion sensor, a camera, a microphone or other means for receiving information from a user. In some embodiments, the display 204 and the input devices 206 are integrated into the chassis 202.

Located in the chassis 202 is a display interface 210, a peripheral interface 212, a bus 214, a processor 216, a memory 218, a network interface 220, and an information storage device 222. The display interface 210 may take the form of a video card or other suitable interface that accepts information from the bus 214 and transforms it into a form suitable for display 204. Conversely, the peripheral interface may accept signals from input devices 206, 208 and transform them into a form suitable for communication on bus 214. Bus 214 interconnects the various elements of the computer and transports their communications.

Processor 216 gathers information from the other system elements, including input data from the peripheral interface 212 and program instructions and other data from the memory 218, the information storage device 222, or from a remote location via the network interface 220. (The network interface 220 enables the processor 216 to communicate with remote systems via a wired or wireless network.) The processor 216 carries out the program instructions and processes the data accordingly. The program instructions may further configure the processor 216 to send data to other system elements, including information for the user which may be communicated via the display interface 210 and the display 204.

The processor 216, and hence the computer as a whole, generally operates in accordance with one or more programs stored on an information storage device 222. One or more of the information storage devices may store programs and data on removable storage media such as a floppy disk or an optical disc. Whether or not the information storage media is removable, the processor 216 may copy portions of the programs into the memory 218 for faster access, and may switch between programs or carry out additional programs in response to user actuation of the input device. The additional programs may be retrieved from information the storage device 222 or may be retrieved from remote locations via the network interface 220. One or more of these programs configures the computer to carry out at least one of the boundary detection and distance estimation methods disclosed herein.

Figure 3A:
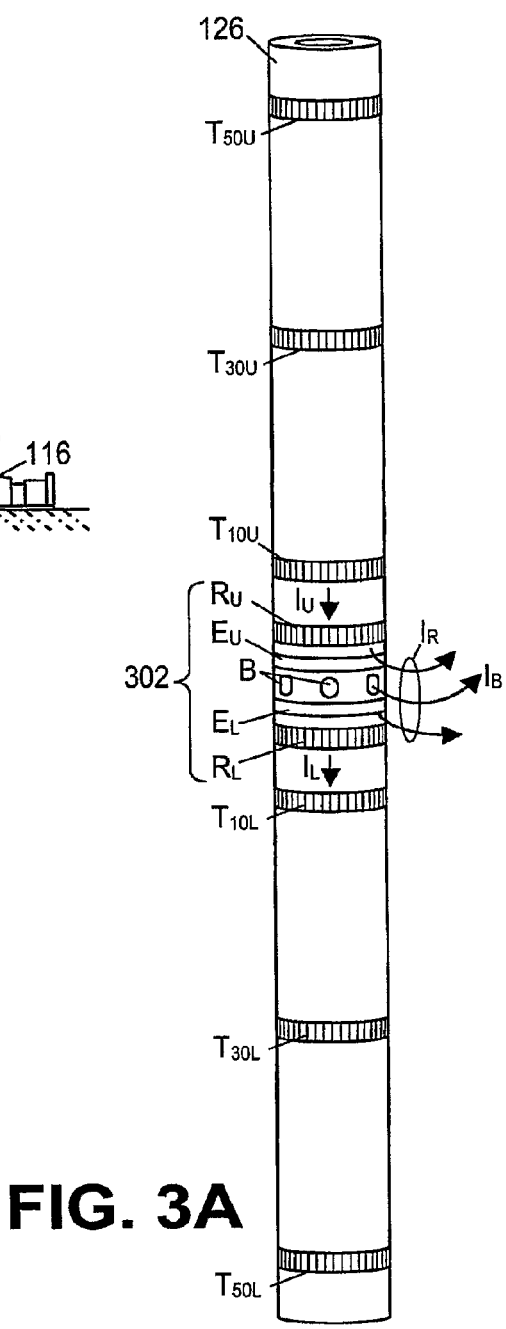
FIGS. 3A and 3B show illustrative LWD resistivity tool embodiments.

FIG. 3A shows an illustrative resistivity logging tool 126, which may be a drill collar having threaded connections for attaching the tool 126 to the other portions of the bottom-hole assembly. The resistivity logging tool includes a sensing assembly 302 positioned between a pair of transmitters, e.g., transmitters $T_{10U}$, $T_{10L}$. (The subscripts indicate the position of the transmitter relative to the sensing assembly 302. The number indicates the transmitter's distance from the center of the sensing assembly, and the "U" for "upper" indicates that the transmitter is located above the sensing assembly, whereas the "L" for "lower" indicates that the transmitter is located below the sensing assembly.) In some embodiments, multiple pairs of symmetrically positioned transmitters are included to provide multiple depths of investigation. That is, the more closely-spaced transmitters yield resistivity measurements over shallower volumes around the borehole than do the more distant transmitters. In the embodiment of FIG. 3A, three transmitter pairs are spaced at 10, 30, and 50 inches, respectively. However, other arrays with different numbers of transmitters and different transmitter positions can be used, including those having staggered transmitter positions similar to those disclosed in U.S. Pat. No. 5,594,343.

The transmitters $T_{50U}$, $T_{30U}$, $T_{10U}$, $T_{10L}$, $T_{30L}$, and $T_{50L}$ are shown as toroids encircling the tool body. A toroid is a winding of one or more loops of conductive wire around a ring of material having a high magnetic permeability. As will be apparent to one skilled in the art, the conductive wire 105 couples to a alternating current generator 140 that causes current to flow through the winding. This flow of current through the winding forms the primary of a transformer, which induces a current in the resistivity tool collar. The return path of the induced current occurs through the formation. However, other current-inducing techniques can be used. For example, the transmitters could be voltage or current sources configured to drive a current between two sides of a nonconductive gap in the tool body.

The sensing assembly 302 includes a mechanism for measuring axial current flow ($I_U$ and/or $I_L$) and radial current flow $I_R$ at the sensing position in the drill string, and may also include a mechanism for measuring a voltage at the sensing position. These mechanisms may take a variety of forms. In FIG. 3A, the sensing assembly 302 includes a pair of receiver toroids $R_U$ and $R_L$. The axial current in the tool body acts as the primary of a transformer, which induces a current in the receiver windings. The conductive wire wound about the magnetic core in the receiver toroids couples to appropriate circuitry to determine the amount of current induced in the receiver windings. However, each of these toroids could be replaced with a current sensor between the two sides of an insulated gap in the tool body.

The radial current flow from between the two receivers is equal to the difference between the axial current flows measured by the receivers. The sensing assembly 302 can measure radial current flow as a function of azimuthal angle by including azimuthally-spaced electrodes or "buttons" B from which corresponding current flows $I_B$ are measured. Suitable button constructions are described in U.S. Pat. No. 5,339,037, but other constructions are possible. Each button generally includes a conductive surface that is electrically insulated from the tool body except for a conductive path through which the current flow can be monitored. Optionally, the sensing assembly 302 may include one or more ring electrodes to enable voltage measurements. In some embodiments, two ring electrodes $E_U$, $E_L$ are provided to measure the axial voltage drop across the buttons B, or alternatively, across the entire sensing assembly 302.

Figure 3B:
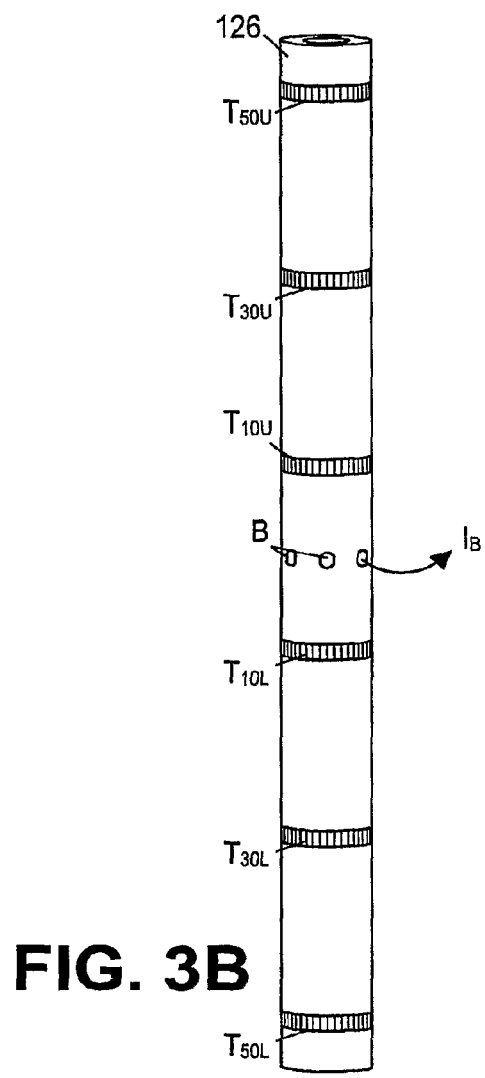

FIG. 3B shows an alternative resistivity logging tool embodiment in which the sensing assembly consists only of button electrodes B. The radial current $I_R$ may be taken as the sum of the button currents $I_B$. The resistivity can then be calculated as a function of the current(s) and the transmit signal voltages.

Figure 4:
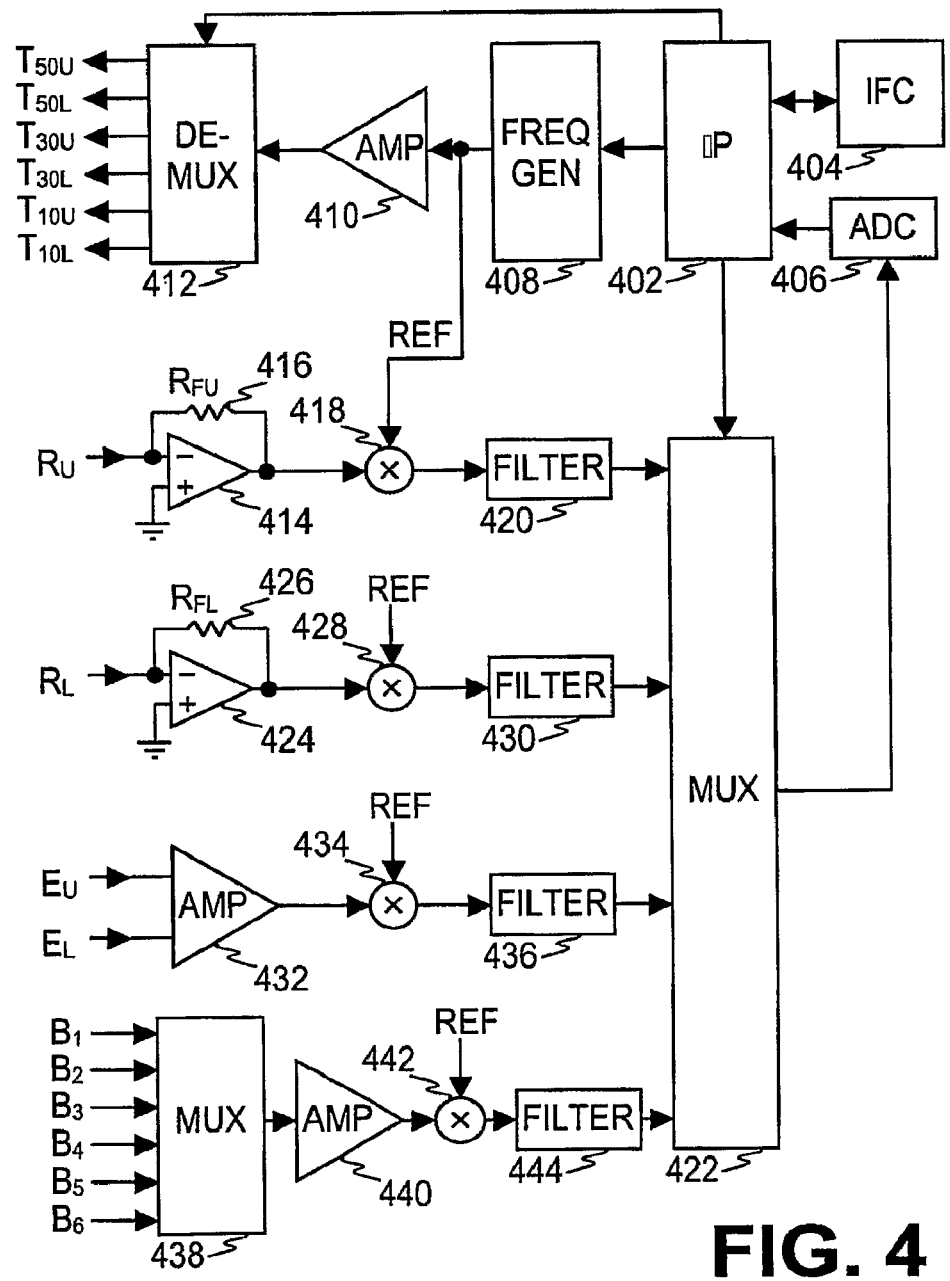
FIG. 4 shows an illustrative circuit configuration for the tool of FIG. 3A.

FIG. 4 shows an illustrative circuit configuration for resistivity logging tool 126. A microprocessor 402 interacts with a bottom-hole assembly controller via interface 404. The bottom-hole assembly controller, in response to command and configuration information received from the driller, configures the operation of the various logging tools including resistivity logging tool 126. The microprocessor 402 executes embedded firmware to fire the transmitters, to measure the receiver responses, and to process the measurements to obtain telemetry data for storage or transmission to the surface. However, the microprocessor 402 may include various configuration registers that can be set by the bottom-hole assembly controller to configure the operation with such parameters as, e.g., transmit frequency, measurement sampling rate, azimuthal bin size, number of measurements to aggregate, and selection of available processing algorithms for generating telemetry data. In accordance with the given operating parameters, the microprocessor collects data measurements via one or more analog-to-digital converters (ADC) 406 and processes them, storing intermediate and final results in memory. The microprocessor sends any generated telemetry data via the interface 404 to the bottom-hole assembly controller for communication to the surface.

In at least some contemplated operating modes, the microprocessor 402 sequentially energizes each of the transmitters $T_{50U}$, $T_{50L}$, $T_{30U}$ $T_{30L}$, $T_{10U}$, and $T_{10L}$. The microprocessor 402 provides a control signal to frequency generator 408 to select a transmit signal frequency. In some embodiments, the transmit signal frequency is systematically varied during the logging process, but the present discussion assumes that a constant transmit signal frequency is employed. The transmit signal frequency is preferably in the range between 1 kHz and 40 kHz, but other frequencies may be suitable.

The frequency generator 408 generates an analog alternating signal having the selected frequency. An amplifier 410 amplifies the signal power in order to drive the transmitter selected by de-multiplexer 412. The microprocessor 402 switches the de-multiplexer 412 in sequence to drive each of the transmitters in turn. After each switching event, the microprocessor 402 may pause before collecting measurements so that any switching transients are allowed to die out.

FIG. 4 shows current-to-voltage converter circuits (operational amplifier 414 with feedback resistor 416, and operational amplifier 424 with feedback resistor 426) to amplify the signals from the receiver toroids $R_U$ and $R_L$. The voltage signal from toroid $R_U$ is mixed with a reference signal from frequency generator 408 by multiplier 418 and filtered by a low pass filter 420 to convert the voltage signal to baseband. Similarly, the voltage signal from toroid $R_L$ is mixed with the reference signal from frequency generator 408 by multiplier 428 and filtered by a low pass filter 430 to convert the voltage signal to baseband.

A differential amplifier 432 amplifies the voltage difference between the ring electrodes $E_U$ and $E_L$. The amplified signal is mixed with the reference signal by a multiplier 434 and filtered with a low pass filter to convert the difference signal to baseband.

A multiplexer 438 selects a current signal from one of the buttons under control of the microprocessor 402. The selected current signal is amplified by amplifier 440, then converted to baseband by multiplier 442 and low pass filter 444. A second multiplexer 422 operates under control of the microprocessor to select one of the baseband signals produced by filters 420, 430, 436, and 444. The selected signal is converted to a digital value by ADC 406, and sampled by microprocessor 402. In this manner, the microprocessor 402 can selectively fire any one of the transmitters, and measure the resulting signals from each of the receiver toroids, the voltage drop between the ring electrodes, and the current flow signals from each of the azimuthal buttons.

From these measurements, the microprocessor 402 calculates a number of values. For example, the microprocessor 402 determines the radial current flowing into the formation between the receiver toroids based upon the axial currents detected by the two receivers. Because the number of windings in the toroids are known, the axial current $I_U$ in the tool body can be calculated as $$I_U = \frac{nV_U}{R_{FU}} \quad (1)$$

where $V_U$ is the amplitude of the baseband signal derived from the first receiver toroid, n is the number of loops in the toroid winding, and $R_{FU}$ is the value of the feedback resistor in the current to voltage converter. The axial current $I_L$ is similarly calculated.

In some contemplated modes of operation, symmetrically positioned transmitters are fired in turn. That is, $T_{50L}$ is fired after $T_{50U}$, $T_{30L}$ is fired after $T_{30U}$, and $T_{10L}$ is fired after $T_{10U}$. For each transmitter firing, the axial currents at each receiver toroid are measured, and the radial current is calculated from the difference:

$$I_R = \begin{cases} I_U - I_L, & \text{for the upper transmitters} \\ I_L - I_U, & \text{for the lower transmitters} \end{cases} \quad (2)$$

Once the radial current flow is known, the microprocessor can determine a formation resistivity measurement R for each transmitter using Ohm's Law as follows:

$$R = k(V_m / I_R). \quad (3)$$

where $V_m$ is the measured voltage drop between the ring electrodes, and k is a tool constant that, among other things, depends on the spacing between the receiver toroids. In this manner six resistivity values $R_{50U}$, $R_{50L}$, $R_{30U}$, $R_{30L}$, $R_{10U}$, and $R_{10L}$ are found. In the tool embodiment of FIG. 3B, equation (3) can be used with $V_m$ being the transmit signal voltage and k being a tool constant that varies based on the transmitter spacing. The resistivity values determined from each transmitter pair (e.g., $T_{30U}$ and $T_{30L}$) can be combined as described further below to obtain compensated resistivity values $R_{50}$, $R_{30}$, and $R_{10}$ as described further below. Due to the transmitter spacings, the different compensated resistivity values correspond to different depths of investigation around the borehole.

The foregoing resistivity measurements are full radial resistivity measurements. Azimuthal resistivity measurements can be derived using equation (3) with button currents $I_B$ measured from each of the button electrodes. As the logging tool rotates and progresses along the borehole, the azimuthal resistivity measurements can be collected to form an image of the resistivity surrounding the borehole. In some alternative embodiments, the azimuthal current measurements $I_B$ may be combined to obtain the full radial resistivity measurements. In an alternative method for measuring azimuthal resistivity, the button electrode voltages relative to a ring electrode can be measured and divided by the radial current $I_R$ in an equation similar to equation (3).

Figure 5:
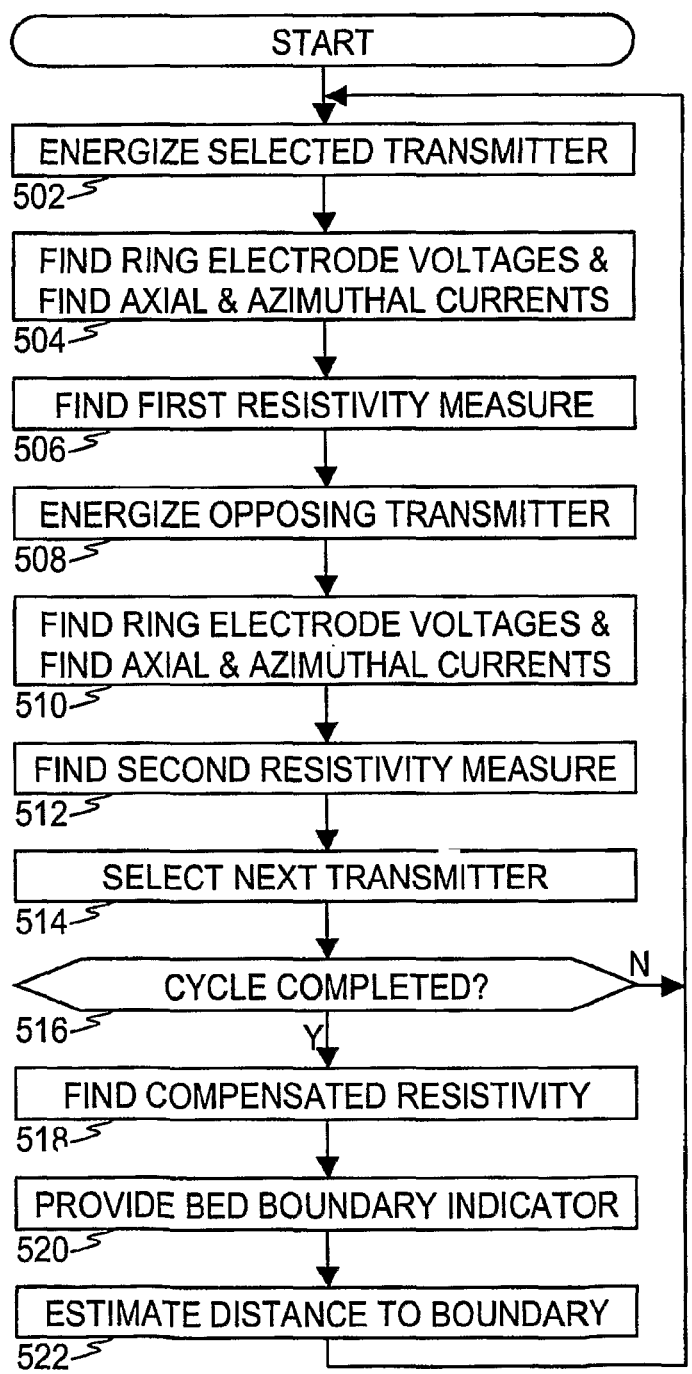
FIG. 5 shows a flowchart of an illustrative look-ahead boundary detection and distance measurement method.

FIG. 5 shows a flowchart of an illustrative resistivity logging method suitable for use with the tool of FIG. 3A. The method includes a set of actions that are repeated cyclically during drilling operations. Though for illustrative purposes, the actions are shown here as sequential steps, it should be recognized that various actions can be performed in a different order, or even performed concurrently by different parts of the system.

Beginning with block 502, the microprocessor 402 energizes one of the transmitters, causing it to induce a current flow in the tool body. As the method repeats, the microprocessor will iterate through each of the transmitters in turn. In block 504, the microprocessor measures the ring electrode voltages, the axial currents, and the azimuthal currents. From these measurements, the microprocessor determines a first resistivity measurement using Ohm's Law in block 506. In block 508, the microprocessor energizes the opposing transmitter, i.e., the transmitter at the same distance on the opposite side of the sensing assembly, and determines the resulting ring electrode voltage, axial current, and azimuthal current measurements in block 510. In block 512, the microprocessor determines a second resistivity measurement associated with the opposing transmitter. In block 514, the microprocessor selects a transmitter from the next transmitter pair, and in block 516 the microprocessor determines whether each of the transmitters has been energized. If not, the actions of blocks 502-516 are repeated.

Once measurements have been made for each transmitter, the microprocessor combines measurements from opposing transmitters to obtain compensated resistivity measurements in block 518. In some embodiments, the resistivity measurements are averaged together:

$$R_{50}=\tfrac{1}{2}(R_{50U}+R_{50L})$$

$$R_{30}=\tfrac{1}{2}(R_{30U}+R_{30L})$$

$$R_{10}=\tfrac{1}{2}(R_{10U}+R_{10L}) \quad (4)$$

In some alternative embodiments, the conductivities ($\sigma=1/R$) are averaged together:

$$\sigma_{50}=\tfrac{1}{2}(\sigma_{50U}+\sigma_{50L})$$

$$\sigma_{30}=\tfrac{1}{2}(\sigma_{30U}+\sigma_{30L})$$

$$\sigma_{10}=\tfrac{1}{2}(\sigma_{10U}+\sigma_{10L}) \quad (5)$$

Yet other compensation techniques could be employed, including a compensated current calculation for a given transmit signal voltage as disclosed in U.S. Pat. No. 5,339,037. In that patent, a current measurement in response to one transmitter is scaled relative to the current measurement in response to an opposing transmitter. The scale factor is determined by a ratio of the measurements made by a receiver toroid. The compensated resistivity is then determined from the compensated current.

In block 520, the first and second resistivity measurements for one or more transmitter pairs are combined to form a bed boundary indicator. In some embodiments the bed boundary indicator S is the difference between the first and second resistivities:

$$S_{50}=R_{50L}-R_{50U}$$

$$S_{30}=R_{30L}-R_{30U}$$

$$S_{10}=R_{10L}-R_{10U} \quad (6)$$

As one variation, the magnitude of the difference may be used. In some embodiments, the logarithm of the ratio between the first and second resistivities may be used:

$$S_{50}=\log(R_{50L}/R_{50U})$$

$$S_{30}=\log(R_{30L}/R_{30U})$$

$$S_{10}=\log(R_{10L}/R_{10U}) \quad (7)$$

As another variation, the magnitude of the logarithm may be used to determine the bed boundary indicator signals.

Microprocessor 402 may perform the operation of block 520, or alternatively, the microprocessor 402 may communicate the necessary information to a surface computing facility such as the computer of FIG. 2. In at least some embodiments, the calculations of block 520 and 522 are performed by a desktop computer. In block 522, the computer processes the resistivity measurements and bed boundary indicator signals to estimate a distance to the bed boundary. To obtain the estimated distance, the computer may first determine if the bed boundary indicator exceeds a threshold value, and if so, the computer may apply an inversion algorithm to the resistivity measurements and/or bed boundary indicator signals. The inversion may be based on a parameterized model or upon resistivity measurements taken from a pilot well. Blocks 502-522 are repeated continuously or periodically as the logging tool progresses through the borehole to obtain a resistivity log or resistivity image of the formations surrounding the borehole. The bed boundary indicator, the estimated boundary distance, the resistivity log and/or the resistivity image can be stored for further use, e.g., on an information storage device 322 (FIG. 2), or displayed for real-time use by the driller, e.g., on display 304.

Figure 6:
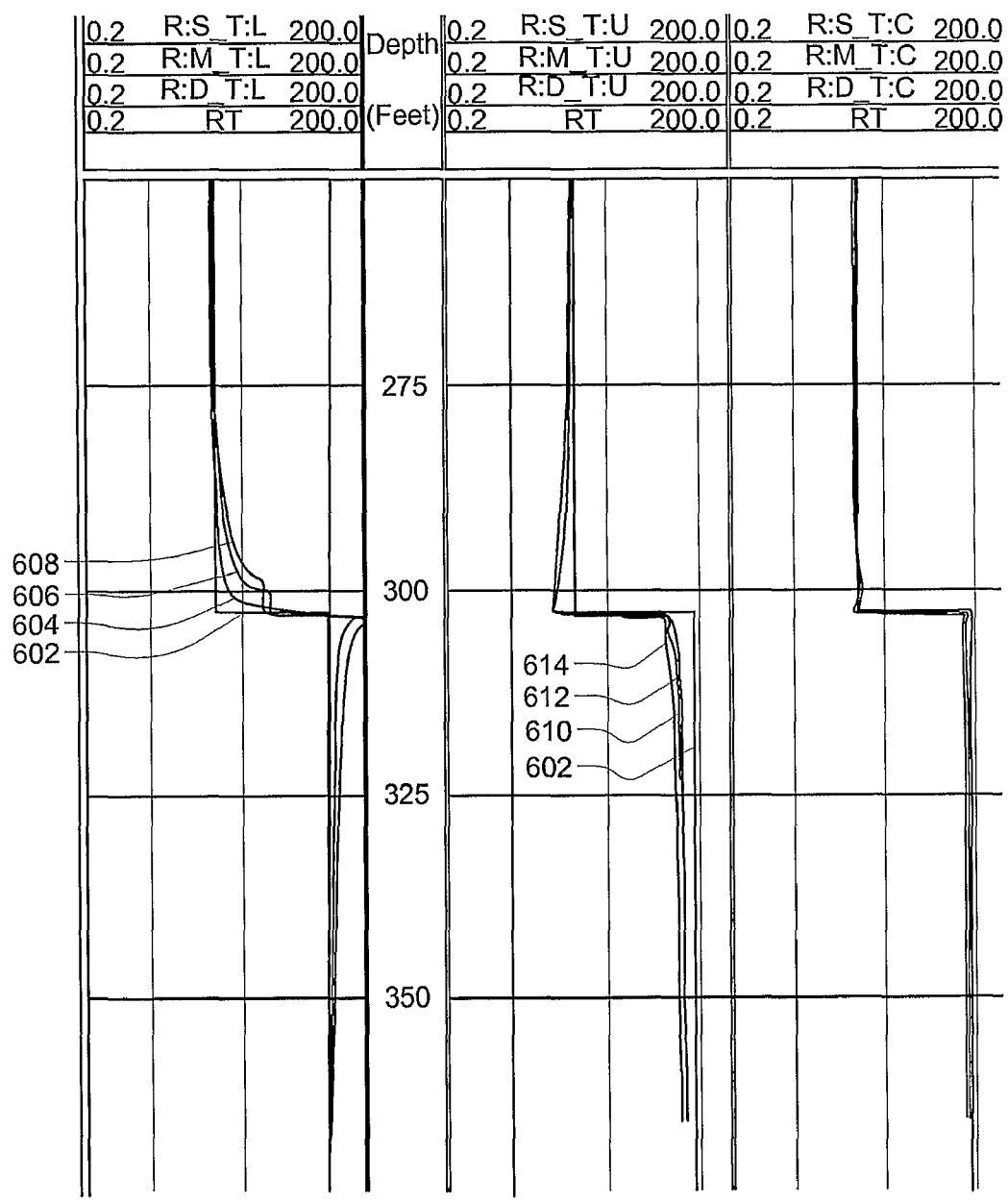
FIG. 6 shows modeled resistivity measurement curves at 4 kHz for the tool of FIG. 3B.

FIG. 6 shows modeled resistivity measurement curves with a 4 kHz transmit signal frequency for the tool of FIG. 3B. The performance of the resistivity logging tool was simulated while assuming a formation resistivity profile given by curve 602. At depths of less than 303 ft, the formation resistivity is assumed to be 5 Ωm, and at depths greater than 303 ft, the formation resistivity is assumed to be 90 Ωm. The curves on the left track of FIG. 6 are the resistivity measurements in response to the lower transmitters: R10L (curve 604), R30L (curve 606) and R50L (curve 608). The curves on the center track are the resistivity measurements in response to the upper transmitters: R10U (curve 610), R30U (curve 612), and R50U (curve 614). The curves on the right track are the compensated resistivity measurements, and are essentially indistinguishable from the actual profile curve 602.

Figure 7:
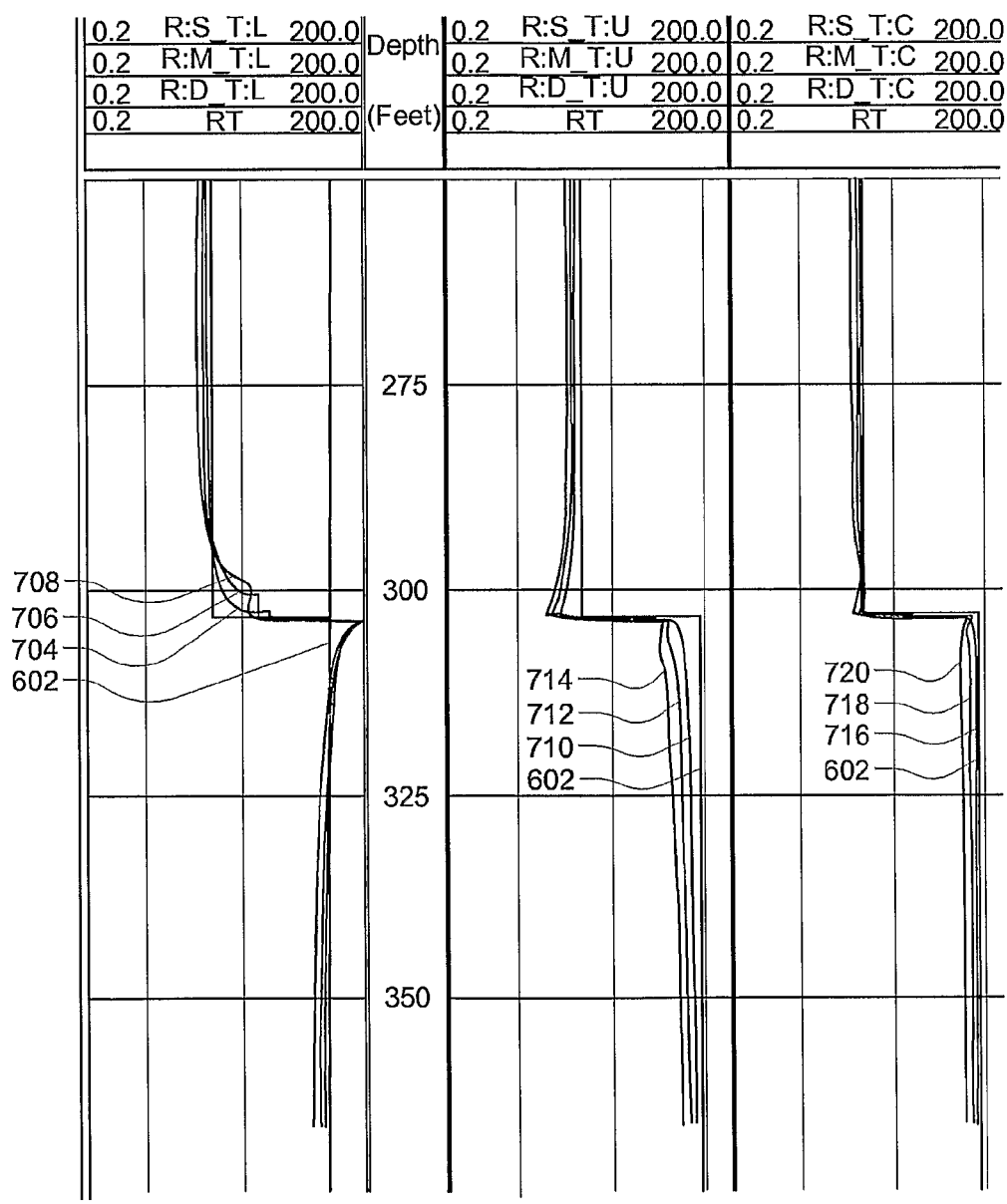
FIG. 7 shows modeled resistivity measurement curves at 32 kHz for the tool of FIG. 3B.

FIG. 7 shows modeled resistivity measurement curves with a 32 kHz transmit signal frequency for the tool of FIG. 3B. The same resistivity profile was used (curve 602). As before, the curves on the left track are the resistivity measurements in response to the lower transmitters: R10L (curve 704), R30L (curve 706) and R50L (curve 708). The curves on the center track are the resistivity measurements in response to the upper transmitters: R10U (curve 710), R30U (curve 712), and R50U (curve 714). The curves on the right track are the compensated resistivity measurements: R10 (curve 716), R30 (curve 718), and R50 (curve 720).

Figure 8:
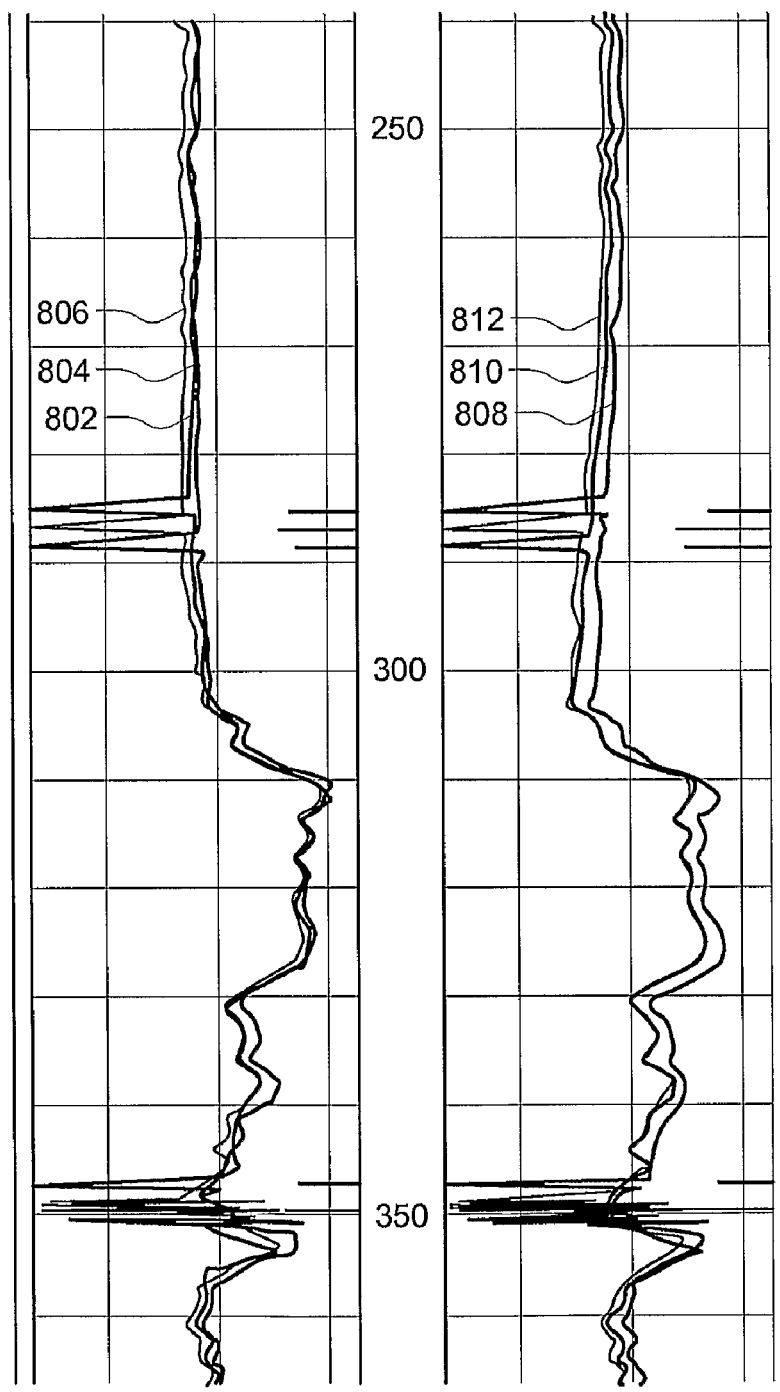
FIG. 8 shows resistivity curves derived from a well log.

FIG. 8 shows resistivity curves derived from actual logging measurements. On the left track are resistivity measurements in response to the lower transmitters: R10L (curve 802), R30L (curve 804) and R50L (curve 806). The curves on the right track are the resistivity measurements in response to the upper transmitters: R10U (curve 808), R30U (curve 810), and R50U (curve 812). The upper and lower transmitter curves exhibit the same general responses to the resistivity boundary at around 308 ft that is observed in FIGS. 6 and 7.

Figure 9:
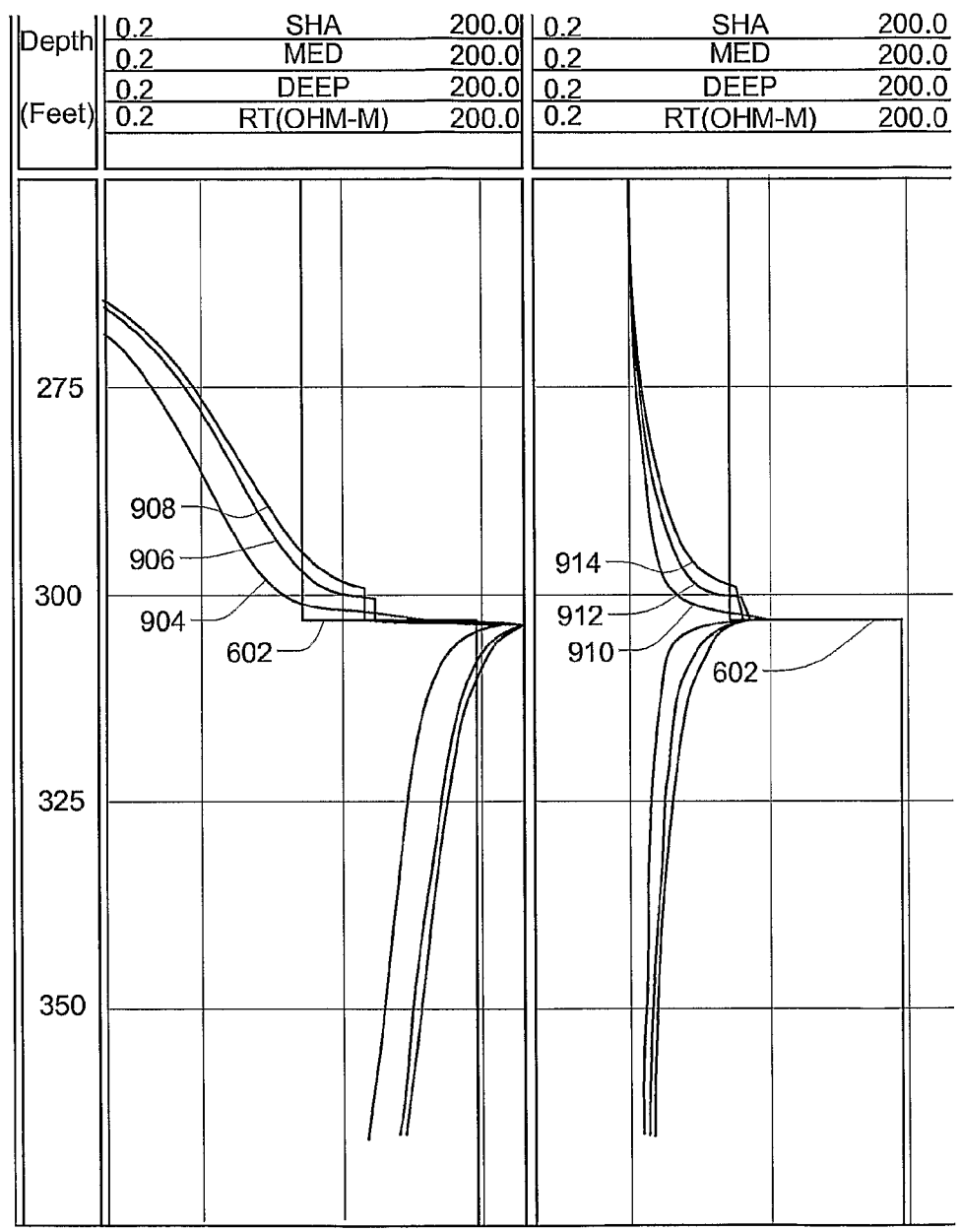
FIG. 9 shows illustrative look-ahead boundary detection curves.

FIG. 9 shows illustrative look-ahead boundary indicator curves derived from the resistivity measurements of FIG. 6. The boundary indicator curves on the left track are determined in accordance with equation (6): S10 (curve 904), S30 (curve 906) and S50 (curve 908). The boundary indicator curves on the right track are determined in accordance with equation (7): S10 (curve 910), S30 (curve 912) and S50 (curve 914). Note that the bed boundary indicators on the right track are relatively symmetric around the transition, and that they are sensitive enough to indicate a approaching bed boundary while the boundary is 20 ft distant.

Figure 10:
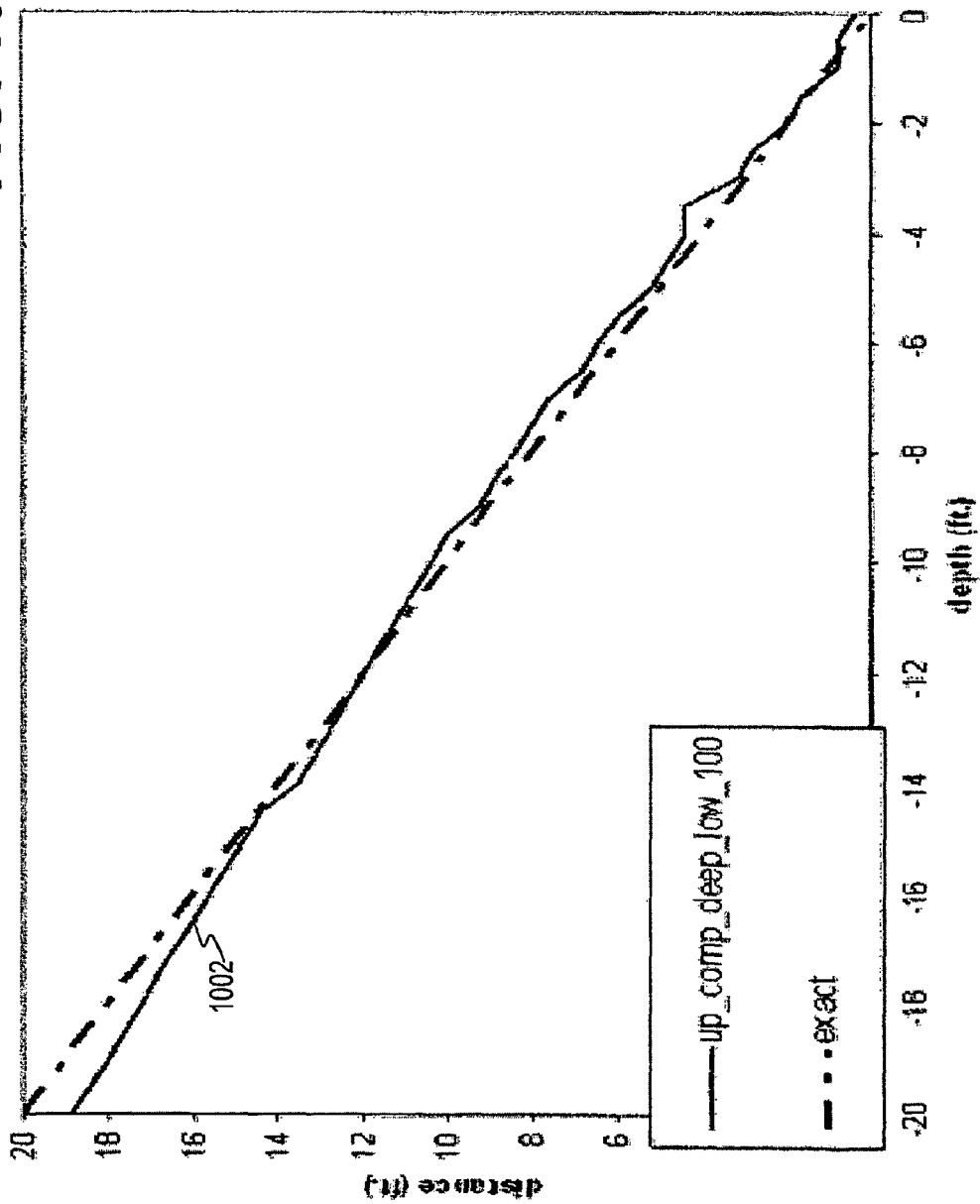
FIG. 10 shows an illustrative graph of boundary detection distance vs. actual distance.

FIG. 10 shows an illustrative graph of boundary detection distance vs. actual distance. The boundary detection distance is derived from an inversion of the R50L and R50U measurements using a parameterized model with a single boundary with the distance and resistivity as model parameters. As the logging tool approaches the bed boundary (true distance provided by the x-axis), the estimated distance to the boundary (y-axis) is shown. The resulting curve 1002 closely matches the ideal curve, making it possible for a driller to determine an accurate stop point to avoid penetrating into undesirable formations. For example, a driller may wish to anchor well casing two feet above the lower boundary of a consolidated, cohesive formation, and may stop drilling when the estimated distance to the lower boundary reaches the two-foot mark.

Numerous variations and modifications will become apparent to those skilled in the art once the above disclosure is fully appreciated. For example, similar measurements can be made by a logging tool having a transmitter in place of the receiving assembly, and a receiving assembly in place of each transmitter. Resistivity values can be equivalently expressed as conductivity values. It is intended that the following claims be interpreted to embrace all such variations and modifications. In both tool configurations, the phrase "upward looking" measurement refers to a measurement made by a receiving assembly that is more distant from the drill bit than the active transmitter, and the phrase "downward looking" measurement refers to a measurement made by a receiving assembly that is between the drill bit and the active transmitter.

What is claimed is:

1. A drilling method that comprises:
   drilling a borehole with a drill string that includes a resistivity logging tool that makes upward-looking and downward-looking resistivity measurements based on radial current flow;
   deriving a bed boundary indicator from a difference or ratio between upward-looking and downward-looking resistivity measurements; and
   estimating a distance to an approaching bed boundary from the upward-looking and downward-looking resistivity measurements when the bed boundary indicator exceeds a threshold value.

2. The method of claim 1, further comprising at least temporarily halting extension of the borehole when the estimated distance reaches a desired value.

3. The drilling method of claim 2, further comprising:
   setting casing in the borehole, wherein the desired value is chosen to ensure that the casing is anchored above the boundary.

4. The drilling method of claim 1, wherein the upward looking measurements are based at least in part on a radial current flow at a sensing position on the tool body that results from axial current flow generated by a first transmitter, and wherein the downward looking measurements are based at least in part on a radial current flow at the sensing position that results from axial current flow generated by a second transmitter opposite the first transmitter relative to the sensing position.

5. The drilling method of claim 4, wherein the logging tool comprises:
   a pair of axially-spaced electrodes that measure a voltage drop at the sensing position in response to the axial currents generated by the first and second transmitters, wherein the upward and downward looking measurements are based at least in part on the measured voltage drops.

6. The drilling method of claim 5, wherein the estimated distance is determined from a formation model having parameters optimized to fit the upward and downward looking measurements.

7. A resistivity logging system that comprises:
   a resistivity logging while drilling tool that makes upward looking and downward looking resistivity measurements based on radial current flow from a sensing position on the tool body; and
   a processor that derives a bed boundary indicator from a difference or ratio between upward-looking and downward-looking resistivity measurements and that further converts the upward looking and downward looking resistivity measurements into an estimated distance to an approaching bed boundary.

8. The system of claim 7, wherein the bed boundary indicator value is derived from a difference between the upward looking and downward looking resistivity measurements.

9. The system of claim 7, wherein the bed boundary indicator value is derived from a ratio between the upward looking and downward looking resistivity measurements.

10. The system of claim 7, wherein the processor displays the estimated distance only if the bed boundary indicator has a magnitude greater than or equal to a given threshold.

11. The system of claim 7, wherein the resistivity logging tool comprises:
    a sensing assembly at the sensing position, wherein the sensing assembly includes a pair of receiver toroids to measure axial current flow to and from the sensing position, and pair of axially spaced electrodes to measure a voltage drop at the sensing position; and
    at least one pair of transmitter toroids located on opposite sides of the sending position to induce axial current flows in the tool body.

12. A boundary detection method that comprises:
    generating a current flow in a conductive body in a borehole with a first transmitter;
    obtaining a first measurement indicative of a resulting radial current flow at a sensing position on the conductive body;
    generating a current flow in the conductive body with a second transmitter located opposite the first transmitter relative to the sensing position;
    obtaining a second measurement indicative of a resulting radial current flow at the sensing position; and
    determining a bed boundary indicator signal based at least in part on the first and second measurements.

13. The method of claim 12, wherein the first and second measurements are each the difference of two axial current flows measured at axially-spaced positions on the conductive body.

14. The method of claim 12, wherein the first and second measurements are each the sum of current flows from azimuthally spaced electrodes.

15. The method of claim 12, wherein determining the bed boundary indicator signal includes:

measuring a first and second voltage drop between axially-spaced electrodes at the sensing position in response to operation of the first and second transmitters.

16. The method of claim 15, wherein determining the bed boundary indicator signal further includes:
calculating a first resistivity from the first radial current flow measurement and the first voltage drop; and
calculating a second resistivity from the second radial current flow measurement and the second voltage drop.

17. The method of claim 16, wherein determining the bed boundary indicator signal further includes:
determining a ratio of the first and second resistivities.

18. The method of claim 16, wherein determining the bed boundary indicator signal further includes:
determining a difference of the first and second resistivities.

19. The method of claim 12, further comprising:
inverting a set of radial current flow measurements to estimate a distance to a bed boundary.

* * * * *